Patented Jan. 5, 1954

2,665,276

UNITED STATES PATENT OFFICE 2,665,276

SPIROCYCLOHEXYLQUINOLINES AND METHODS OF PREPARATION THEREOF

Louis H. Schwartzman, Pittsburgh, Pa., and Gilbert Forrest Woods, Jr., Silver Spring, Md.

No Drawing. Application July 9, 1952,
Serial No. 298,194

6 Claims. (Cl. 260—283)

This invention relates to compounds of the spirocyclohexane type and methods of preparation thereof.

More particularly, the invention relates to the synthesis of compounds of the spirocyclohexane type, particularly those having analgesic properties such as possessed by morphine and other opiates derived from natural sources.

Considerable effort has been directed in the past toward the synthesis of suitable analgesics as substitutes for morphine and the like, particularly in view of the fact that the principal source of supply of morphine and related compounds is dependent upon natural sources, most of which are presently located in the Orient. In an effort to produce chemically synthesized analgesics domestically on an economically practicable basis, and to provide a source of analgesics independent of natural supplies of raw materials, many attempts have been made to synthesize various analgesics as substitutes for morphine and the like, some of the more recently developed compounds being

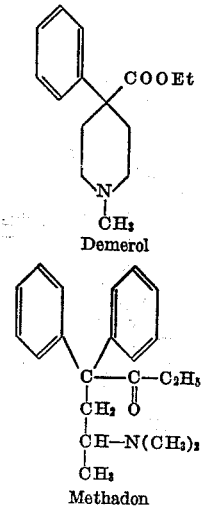

etc.

Among other things, it has been found that many synthetic compounds produced heretofore, although having some of the analgesic properties of morphine and the like, are not satisfactory from the standpoint of manufacturing costs, and even in some cases are unsuitable for use by human beings becaues of their high toxicity or side-effects and other undesirable properties.

It is found that compounds of the present invention are not relatively simple and inexpensive to manufacture from readily available raw materials but, in addition, have satisfactory analgesic properties and are of sufficiently low toxicity to permit safe use by human beings.

In its more specific aspects the present invention pertains to the synthesis of analgesic compositions of the spirocyclohexane type by employing cyclohexanone as a starting material and producing therefrom a large number of new, novel and useful analgesic compounds containing a quaternary carbon atom in the molecule and, in addition, either a primary, secondary, or tertiary amine group.

The invention also provides new and novel methods of preparing the compounds described herein, such methods being particularly advantageous in view of the simplicity of the procedures, economic practicability and comparatively high yields of the intermediates and the end products without the use of complicated or expensive starting materials, apparatus, or processes.

The intermediates required for synthesis of the compounds of the present invention may be prepared, for example, in the manner described in copending application Serial No. 150,806, now Patent No. 2,586,486, by using cyclohexanone as a starting material, treating it with a mixture of calcium carbide and potassium hydroxide to yield an acetylenic glycol such as 1,1'-ethynylene-bis-cyclohexanol according to the reaction:

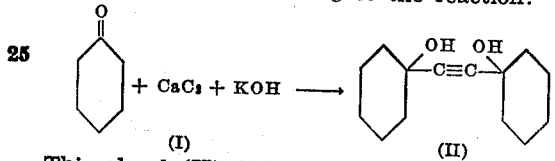

This glycol (II) is then dehydrated to the dieneyne (III) by, for instance, heating the above glycol under reflux conditions with dilute sulfuric acid as follows:

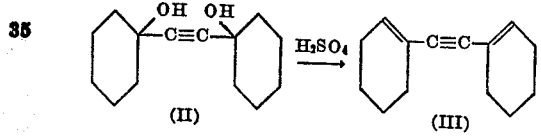

The compound thus obtained is then cyclized and hydrated, for example, by refluxing with formic acid, thus producing as intermediates, cyclic ketones such as spiro [cyclohexane-1,1'-Δ9'-tetrahydroindanone-3'] (IV) and its isomer spiro - [cyclohexane - 1,1'-Δ8'-tetrahydroindanone-3'] (V) in accordance with the following reaction:

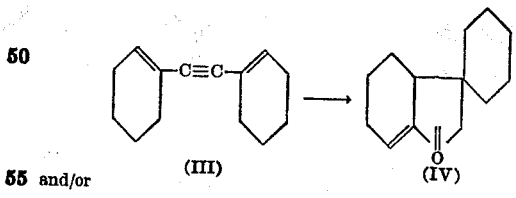

and/or

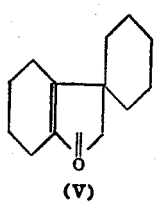

To produce the analgesic compounds of the present invention, the cyclic ketones (IV) and/or (V) are converted to the aromatic ketone (VI) according to the following reaction as set forth in copending patent application Serial No. 150,806, now Patent No. 2,586,486 issued February 19, 1952:

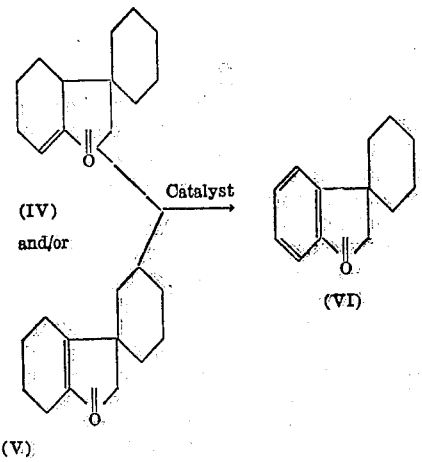

The ketone (VI) is converted to spiro[cyclohexane-1,4'-dihydrocarbostyril] (VII) by appropriate treatment with hydrazoic acid or sodium azide in the presence of sulfuric acid. According to the reaction:

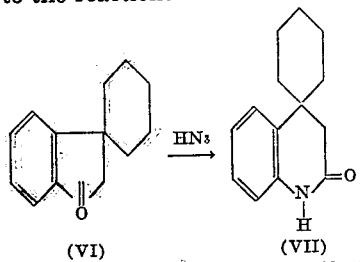

Essentially this is the same result that can be achieved by a Beckmann rearrangement of the oxime of spiro[cyclohexane-1,1'-indanone-3']

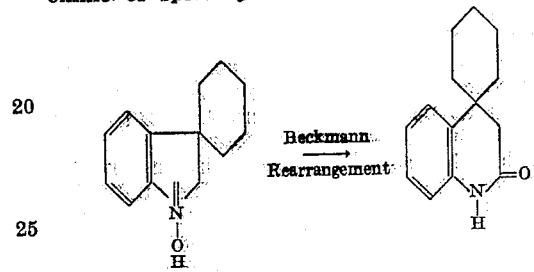

This material (VII) is then utilized in a series of chemical transformations as shown below to yield spirocyclohexylhydroquinolines of the present invention which have substituents either on the heterocyclic nitrogen atom or substituents in the aromatic nucleus, or substituents in both positions

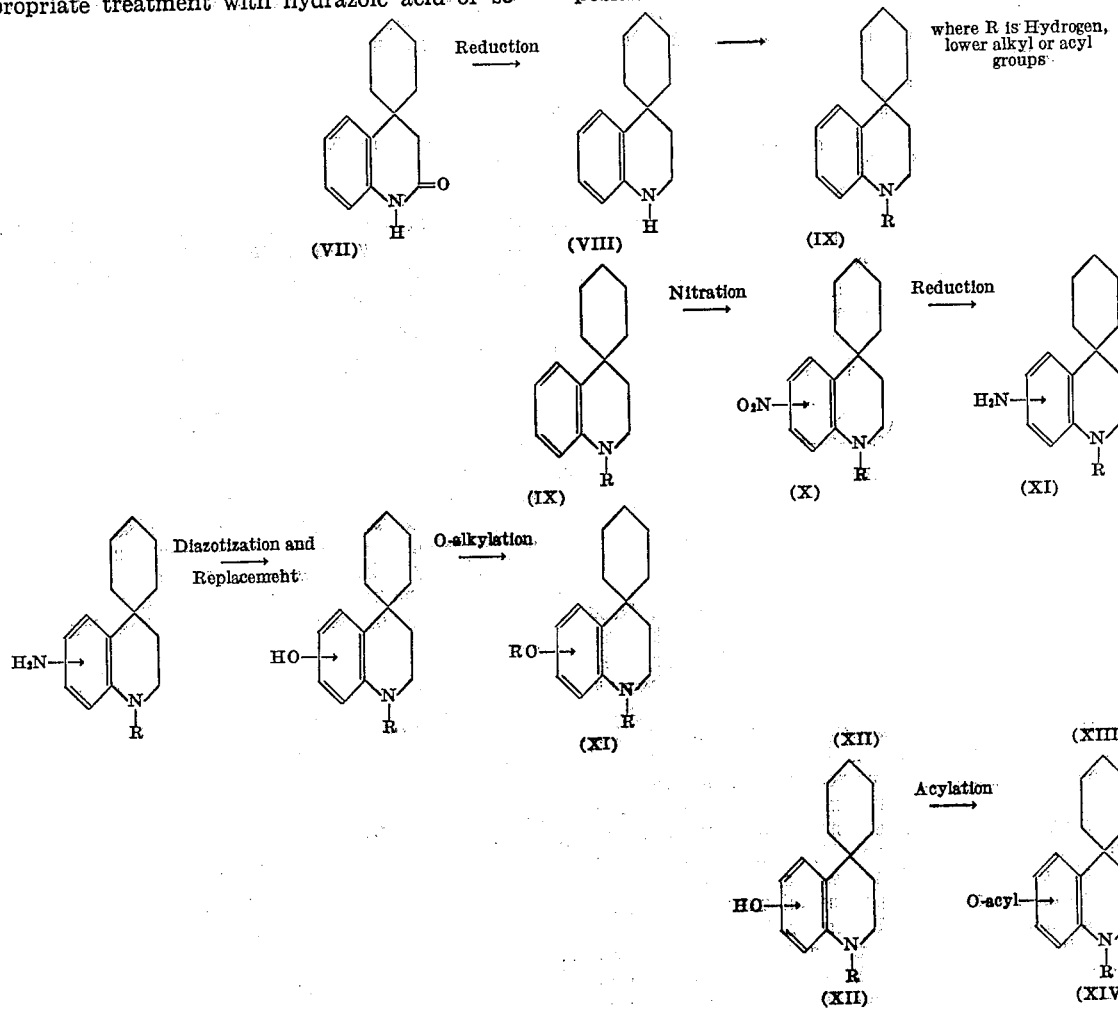

It is an object of the present invention, therefore, to provide a series of spirocyclohexylhydroquinolines having analgesic properties. It is a further object of the present invention to provide a series of spirocyclohexylhydroquinolines having in the molecule a quaternary carbon atom and, in addition, a secondary or tertiary amine group. It is a still further object of the invention to provide substituted spirocyclohexylhydroquinolines. It is a still further object of the present invention to provide methods of preparation of the compounds of the invention.

For purposes of illustration, but without limiting the scope of the patent thereto, representative methods and compounds of the present invention are described in the following examples:

Example I

Spiro-[cyclohexane-1,1' - indanone - 3'] (VI) (13.8 g.) was dissolved in benzene (125 ml.); water (3.3 ml.) and concentrated sulfuric acid (30.4 ml.), enough to make a ninety per cent sulfuric acid solution, was then added and the mixture heated to 55°. Finely powdered sodium azide (6.8 g.) was added portionwise with mechanical stirring over a period of twenty minutes. The mixture, kept at this temperature and stirred continuously for thirty minutes after the evolution of nitrogen had ceased, was cooled and the benzene layer decanted from the sulfuric acid layer. Ice was added, with efficient cooling and mechanical stirring, to the sulfuric acid layer. Continual stirring for one hour and the addition of small portions of ether caused the oily layer to crystallize. Yellow solid spiro[cyclohexane-1,4'-dihydrocarbostyril] (VII) (10.5 g., 71%) so formed is pure enough for use in subsequent reactions. Recrystallization from alcohol-water mixture produced a white, analytical sample melting at 185-185.5°. This compound has the formula:

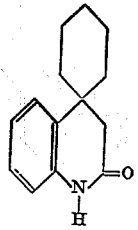

Example II

To a cooled solution of 100 ml. of a 1.2 molar (100 per cent excess) of lithium aluminum hydride in ether, 26.6 g. of spiro[cyclohexane-1,4'-dihydrocarbostyril] in 200 ml. of dry benzene was added drop-wise over one hour; the reaction was vigorous. The ether was then removed by distillation and the mixture refluxed for twenty-four hours to produce a voluminous white precipitate. This complex was decomposed in the cold with just enough water to precipitate all the aluminum hydroxide. Then the benzene layer was decanted, and the gelatinous residue extracted with ether. The amine, spiro[cyclohexane - 1,4' - 1',2',3',4' - tetrahydroquinoline] (VIII), was isolated by acid-base extraction and the viscous, yellow oil distilled under nitrogen: B. P. 156-157° (1.5 mm.), 23.7 g., or 96%. It crystallized from petroleum-ether (30-60°) in a Dry Ice bath and sublimed readily under reduced pressure to yield white crystals melting at 40-50.5°. The compound has the formula:

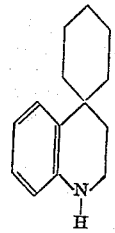

This compound possesses the analgesic effects on white mice described in the following chart:

M. E. D.: 150 mg./kg. body weight.
L. D. 50: 300 mg./kg. body weight.

Example III

A suspension of 2.7 g. of the amine spiro[cyclohexane - 1,4' - 1',2',3',4' - tetrahydroquinoline] (VIII) in 10 ml. of water was refluxed for four hours with 1.73 g. of dimethyl sulfate, and then allowed to stand at room temperature for forty-eight hours. Ammonium hydroxide was added and the basic solution extracted with ether. The amine (2.5 g.) was isolated in the usual manner. This oil was reacted with benzoyl chloride and dilute sodium hydroxide and the unreacted oil extracted with ether. Spiro[cyclohexane - 1,4'-N-methyl-1',2',3',4'-tetrahydroquinoline] (1.25 g., 43%) isolated in the usual manner was distilled under nitrogen: B. P. 134-135° (1 mm.), $n_D^{30}$=1.5778. This compound has the formula:

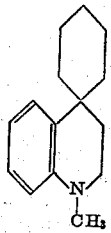

This compound possesses the analgesic effects on white mice described in the following chart:

M. E. D.: 100 mg./kg. body weight.
L. D. 50: 750 mg./kg. body weight.

Example IV

Spiro[cyclohexane - 1,4' - 1',2',3',4' - tetrahydroquinoline] (VIII) is dissolved in about 4 molar equivalents of acetic anhydride and to this solution is added a catalytic amount of pyridine. After several days at room temperature, the solvent is removed under reduced pressure and the residue, spiro[cyclohexane - 1,4' - N - acetyl-1',2',3',4' - tetrahydroquinoline] is recrystallized from water and subsequently sublimed to yield a white, crystalline material melting at 100-102° C. This compound has the formula:

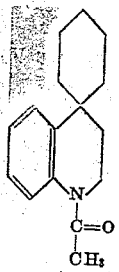

Example V

Spiro[cyclohexane - 1,4'-N-methyl - 1',2',3',4'-tetrahydroquinoline] hydrochloride (3.5 g.) is dissolved in concentrated sulfuric acid (10 ml.), cooled and carbon tetrachloride (100 ml.) added. The two phase system is cooled to −4° C. to −5° C. and with efficient mechanical stirring, potassium nitrate (1.42 g.) in concentrated sulfuric acid (5 ml.) is added over a period of fifteen minutes. The red mixture is then allowed to stir for one and one-half hours and then the carbon tetrachloride layer decanted away and the sulfuric acid layer poured with stirring onto cracked ice. The mixture is then neutralized with sodium bicarbonate and the resulting alkaline mixture extracted with ether. Concentration of the dried ether extract under reduced pressure affords spiro[cyclohexane - 1,4' - N-methyl - x - nitro - 1',2',3',4' - tetrahydroquinoline] which is then converted to the hydrochloride by the addition of absolute alcohol saturated with hydrogen chloride gas. The hydrochloride melts at 246–252° C. (decomposition). The free nitro amine has the formula:

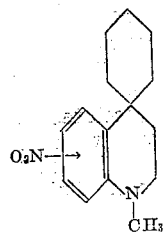

*Example VI*

Spiro[cyclohexane - 1,4' - N - methyl-x-nitro-1',2',3',4' - tetrahydroquinoline] hydrochloride (0.25 g.) was dissolved in 75 ml. of alcohol and hydrogenated at 1 atmosphere of hydrogen at 25° C. with 0.1 g. of Adams' catalyst. The absorption of hydrogen stopped after fifteen minutes and the catalyst was filtered away and the filtrate concentrated to dryness under reduced pressure. The resulting monohydrochloride of spiro[cyclohexane - 1,4' - x - amino - N - methyl-1',2',3',4' - tetrahydroquinoline] was a hygroscopic solid. Therefore the free amine was liberated with base and extracted with ether and dried. Upon concentration of the dried ether solution, the oily diamine resulted. In order to accurately establish the structure, the diamine was treated with acetyl chloride and the resulting white solid after recrystallization from alcohol-ether mixtures melted at 255–260° (decomposition). Analysis showed the structure to be:

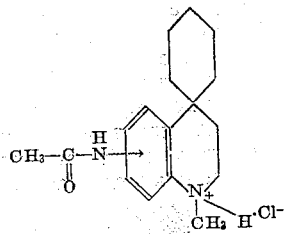

*Example VII*

Spiro[cyclohexane - 1,4' - 1',2',3',4' - tetrahydroquinoline] was nitrated in the same manner as the N-methyl compound and the resulting oily nitroamine, spiro[cyclohexane-1,4'-x-nitro-1',2',3',4'-tetrahydroquinoline], was used directly in the next step since the amine salts were difficult to handle.

*Example VIII*

Spiro[cyclohexane-1,4' - x - nitro - 1',2',3',4' - tetrahydroquinoline] hydrochloride is dissolved in 50 ml. of absolute alcohol and heated to reflux with stirring. Then $SnCl_2 \cdot 2H_2O$ (21 g.) in a mixture of concentrated hydrochloric acid (20 ml.) and alcohol (25 ml.) is added dropwise over a period of fifteen minutes. The mixture is stirred and refluxed for an additional one and one-half hours. The alcohol is then removed under reduced pressure and the acid solution made definitely alkaline with concentrated potassium hydroxide. The amine is extracted with ether, dried and concentrated to give about 3 grams of brown oil. It is sublimed at about 160° C. at 1 mm. and the resulting oil is crystallized and clarified from 60–80 petroleum ether to yield white crystalline spiro[cyclohexane - 1,4' - x - amino - 1',2',3',4' - tetrahydroquinoline] which melts at 95–97° C. This compound has the formula:

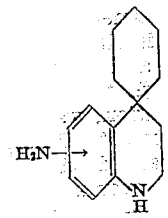

*Example IX*

Spiro[cyclohexane - 1,4' - x - amino - 1',2', 3',4'-tetrahydroquinoline] (2 g.) was dissolved in 2 ml. of acetic anhydride and 1.5 ml. of pyridine. This mixture was allowed to stand four days at room temperature and then the solvent was removed under reduced pressure on a steam cone. When the resulting oil was triturated with cold acetone a mass of white crystals was obtained. Spiro[cyclohexane-1,4' - N - acetyl - x - acetylamino - 1',2',3',4' - tetrahydroquinoline] so obtained was recrystallized from acetone and melted at 185.5–186.5° C.

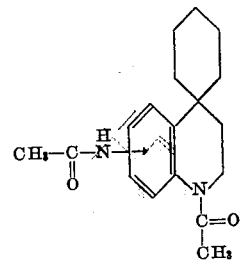

The crystalline diamide (prepared above) (1.4 g.) was added portionwise to a stirred solution of 10 ml. of 1.3 molar lithium aluminum hydride in ether. A vigorous reaction ensued; after the initial reaction subsided, the mixture was stirred and refluxed for an additional 24 hours. The mixture was chilled with an ice bath and decomposed with ice water. The ether layer was separated, dried, and concentrated to give 0.9 g. of oily spiro[cyclohexane-1,4'-N-ethyl-x - ethylamino - 1',2',3',4' - tetrahydroquinoline].

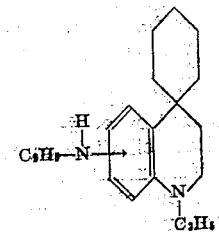

Example X

Spiro[cyclohexane - 1,4' - x - amino - N - methyl-1',2',3',4'-tetrahydroquinoline] is dissolved in dilute sulfuric acid and the solution is stirred and cooled to 0° to 5° C. by means of an ice-salt bath. To this solution is added dropwise an aqueous solution of sodium nitrite. The temperature of the reaction mixture is maintained at 0° to 5° C. during this period by the addition of ice, if necessary. When a slight excess of the sodium nitrite solution has been added stirring is continued for an additional fifteen minutes and then a small amount of urea dissolved in water is added to destroy the excess nitrous acid.

The resulting solution is made more acidic by the addition of 60% sulfuric acid until the concentration of the sulfuric acid is 2 to 15%. This solution is now heated on a steam bath or by means of direct steam introduction into the solution until the reaction temperature is about 95 to 105° and this temperature is maintained for an additional hour, at which time the nitrogen evolution has ceased.

The solution is cooled and made slightly basic with ammonium hydroxide. Extraction with ether and subsequent removal of the ether under reduced pressure affords a residue which is spiro[cyclohexane - 1,4' - x - hydroxy - N - methyl-1',2',3',4'-tetrahydroquinoline] having the formula:

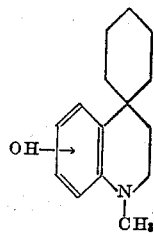

Example XI

Spiro[cyclohexane - 1,4' - x - hydroxy - N-methyl-1',2',3',4'-tetrahydroquinoline] is dissolved in aqueous potassium hydroxide and the solution is refluxed. To this refluxing solution an equivalent amount of dimethyl sulfate is added dropwise and the mixture is then refluxed for an additional few hours. The alkaline mixture is cooled and extracted with ether; concentration of the dried ether extract under reduced pressure affords spiro[cyclohexane - 1,4' - x - methoxy-N - methyl - 1',2',3',4' - tetrahydroquinoline]. This compound has the formula:

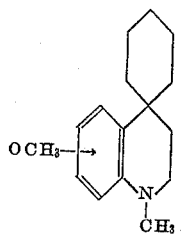

Example XII

Spiro[cyclohexane - 1,4' - x - hydroxy - N-methyl - 1',2',3',4' - tetrahydroquinoline] is dissolved in 4 molar equivalents of acetic anhydride and then a catalytic amount of pyridine is added. After several days at room temperature, the solvent is removed under reduced pressure to yield as a residue spiro[cyclohexane-1,4'-x-acetoxy-N-methyl - 1',2',3',4' - tetrahydroquinoline] having the formula:

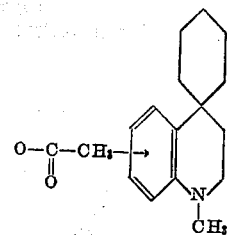

Example XIII 12.5 g. of spiro[cyclohexane-1,1'-x'-methoxyindanone-3'] in 125 ml. of benzene and 22 ml. of 90% sulfuric acid was heated to 55° C. and 4.9 g. of sodium oxide was added over one-half hour. The sulfuric acid layer was separated and decomposed with ice to yield 5 g. of spiro[cyclohexane-1,4'-x-methoxydihydrocarbostyril] which after recrystallization from dilute methanol melted at 161–163° C.

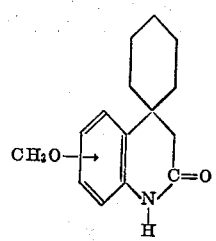

Example XIV

In the same manner as Example II, spiro[cyclohexane-1,4'-x-methoxydihyrocarbostyril] was reduced quantitatively with lithium aluminum hydride to yield spiro[cyclohexane-1,4'-x-methoxy-1',2',3',4'-tetrahydroquinoline] which after recrystallization from petroleum ether and subsequent sublimation melted at 76–77° C.

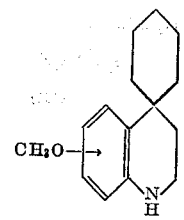

This compound is readily demethylated in the usual manner to spiro[cyclohexane-1,4'-x-hydroxy-1',2',3',4'-tetrahydroquinoline].

In the foregoing examples it will be understood that in lieu of the methyl group other lower alkyl groups such as ethyl, propyl, etc., may be incorporated in the molecule by proper selection of the reacting materials in the manner obvious to those skilled in the art. Likewise, it will be understood that the alkoxy group may be methoxy, ethoxy, propoxy, etc., the acyl group may be acetyl, propionyl, butyryl, etc., and the halogen may be the chloride, bromide iodide, fluoride, etc.

The term M. E. D. is used herein as an abbreviation for the minimal effective dosage for 50% of the animals tested. The term L. D. 50 is used herein as an abbreviation for the lethal dosage for 50% of the animals tested.

This application is a continuation-in-part of copending application Serial No. 150,810, filed March 20, 1950.

It will be understood that other modifications may be made in the foregoing examples without

We claim:
1. Spirocyclohexylhydroquinolines of the type:

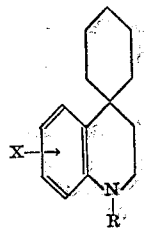

wherein R is selected from the group consisting of hydrogen, lower alkyl groups and lower acyl groups and X is selected from the group consisting of hydrogen, hydroxyl, alkoxyl groups, O-acyl groups, nitro and amino groups.

2. Spiro[cyclohexane-1,4'-N-methyl-1',2',3',4'-tetrahydroquinoline] of the formula:

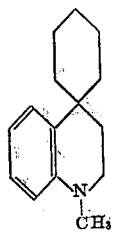

3. Spirocyclohexylhydroquinolines of the formula:

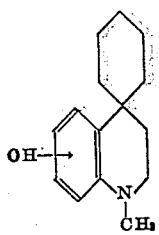

4. Spirocyclohexylhydroquinolines of the formula:

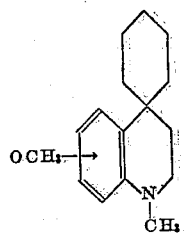

5. Spirocyclohexylhydroquinolines of the formula:

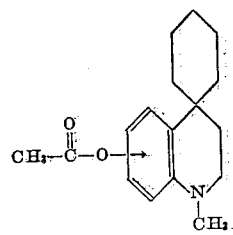

6. Spirocyclohexylhydroquinolines of the formula:

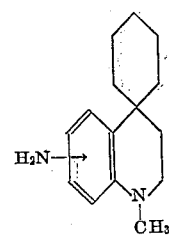

LOUIS H. SCHWARTZMAN.
GILBERT FORREST WOODS, Jr.

No references cited.